United States Patent [19]

Kubo et al.

[11] Patent Number: 5,939,164
[45] Date of Patent: Aug. 17, 1999

[54] ALUMINUM ALLOY SHEET FOR MAGNETIC DISK SUBSTRATE ALUMINUM ALLOY CLAD SHEET FOR MAGNETIC DISK SUBSTRATE AND THEIR MANUFACTURING METHOD

[75] Inventors: Yoshinari Kubo; Ken-ichi Ogura; Yoichiro Bekki; Satoru Yamada; Koji Kinoshita, all of Tokyo, Japan

[73] Assignee: The Furukawa Electric Co., Ltd., Japan

[21] Appl. No.: 08/805,301

[22] Filed: Feb. 25, 1997

[30] Foreign Application Priority Data

Feb. 28, 1996 [JP] Japan ..................................... 8-067342
Sep. 30, 1996 [JP] Japan ..................................... 8-258607

[51] Int. Cl.$^6$ .............................. B32B 3/02; B32B 15/10
[52] U.S. Cl. ...................... 428/65.5; 428/65.6; 428/65.7; 428/548; 428/553; 428/650; 428/654; 428/694 ST; 420/532; 420/533; 420/542; 420/545
[58] Field of Search .................................... 420/532, 533, 420/542, 545; 428/650, 654, 328, 330, 65.5, 65.6, 65.7, 694 ST, 553, 548; 360/135

[56] References Cited

U.S. PATENT DOCUMENTS

| | | | |
|---|---|---|---|
| 3,359,085 | 12/1967 | Anderson | 29/197.5 |
| 3,418,090 | 12/1968 | Fritzlen | 29/197.5 |
| 3,471,272 | 10/1969 | Wilhelm et al. | 29/194 |
| 3,595,631 | 7/1971 | Broverman | 29/197.5 |
| 3,881,883 | 5/1975 | Fritzlen | 29/197.5 |
| 4,631,112 | 12/1986 | Usui et al. | 156/644 |
| 4,722,872 | 2/1988 | Westerman | 428/654 |
| 4,751,958 | 6/1988 | Flowers et al. | 164/473 |
| 5,437,746 | 8/1995 | Usui et al. | 148/439 |
| 5,554,428 | 9/1996 | Bartges et al. | 428/64.1 |

*Primary Examiner*—Paul Thibodeau
*Assistant Examiner*—Holly C. Rickman
*Attorney, Agent, or Firm*—Lorusso & Loud

[57] ABSTRACT

The present invention relates to an aluminum alloy for a magnetic disk substrate having a composition consisting of, by percent by weight, 2.0 to 6.0% of Mg, 0.05 to 0.15% of Cu, 0.10 to 0.30% of Zn and 0.05 to 0.12% of Zr, wherein the contents of Cu, Zn and Zr satisfy the relationship: $0.15\% \leq 2Cu+6Zr-3Zn \leq 0.32\%$ (wherein Cu, Zr, and Zn respectively represent their contents in terms of percent by weight), and the composition further consists of one or both of 0.01 or more to less than 0.05% of Cr and 0.01 or more to less than 0.05% of Mn, impurities consisting of Si, Fe and Ti, which are respectively regulated to be 0.05% or less, 0.05% or less, and 0.02% or less, and other inevitable impurity elements respectively regulated to be 0.02% or less, with the remainder being Al. The present invention also relates to a clad material for a magnetic disk substrate, in which one or both surfaces of a core material, consisting of at least less than 3.0% of Zn with the remainder being Al and inevitable impurity elements, are clad with a surface material consisting of the aluminum alloy having the above composition. The above aluminum alloy composition makes it possible to manufacture a large storage memory capacity magnetic disk in which there is much less formation of micropits or nodules.

4 Claims, No Drawings

ALUMINUM ALLOY SHEET FOR MAGNETIC DISK SUBSTRATE ALUMINUM ALLOY CLAD SHEET FOR MAGNETIC DISK SUBSTRATE AND THEIR MANUFACTURING METHOD

BACKGROUND OF THE INVENTION

1. Field of the Invention

This invention generally relates to an aluminum alloy sheet for a magnetic disk substrate, an aluminum alloy clad sheet for a magnetic disk substrate and their manufacturing method, and more particularly, to an aluminum alloy sheet for a magnetic disk substrate, an aluminum alloy clad sheet for a magnetic disk substrate and their manufacturing method, in which there is less formation of micropits or nodules (i.e., semi-spherical protrusions) in case of plating a substrate to enable a satisfactory coat with a magnetic substance, and also an increase in magnetic disk storage memory capacity.

2. Description of the Prior Art

Recently introduced magnetic disks have attempted to meet demands for increase in storage memory capacity and density in order to answer the needs of multimedia or the like, and show a tendency to reduce the magnetic area per one bit of a magnetic disk of reduced size, and to narrow the distance between a magnetic head and a magnetic disk.

Therefore, the following characteristics have recently become required for a magnetic disk substrate.

(1) It should be made of light weight aluminum alloys of non heat-treatment type (i.e., non precipitation-hardening type), and show strength sufficient to bear various works and high-speed rotation in use.

(2) It should be more lightweight, and have a satisfactory specular surface free from any micropits or the like formed by means of grinding.

(3) The surface resulting from plating the substrate should be smooth and free from any surface defects such as micropits.

(4) A plated substrate layer should show excellent adhesion to the surface material of the magnetic disk substrate.

For a magnetic disk substrate satisfying the above characteristics, use is made of JIS A5086 aluminum alloy (having a composition consisting of, by percent by weight, 3.5 to 4.5% of Mg, 0.5% or less of Fe, 0.4% or less of Si, 0.2 to 0.7% of Mn, 0.05 to 0.25% of Cr, 0.10% or less of Cu, 0.15% or less of Ti, and 0.25% or less of Zn, with the remainder being Al), in which the contents of impurity elements such as Fe and Si causing micropits or the like are regulated.

The magnetic disk substrate is manufactured by the steps of hot-rolling a slab of the above alloy, which is manufactured by a semi-continuous casting method, into a rolled material, subsequently cold-rolling this rolled material while carrying out annealing in the course of cold rolling, then manufacturing the rolled material into a disk by means of stamping, giving this disk a pretreatment including cutting, grinding, polishing, degreasing, etching and treatment with zincate, further giving this disk a substrate treatment including electroless plating with a hard non-magnetic metal such as Ni-P, then polishing the disk thus treated, and thereafter coating the polished disk with a magnetic film such as Co-Ni-P alloy by means of sputtering.

However, the problem with the magnetic disk substrate made of JIS-A-5086 alloy described above is that its electroless-plated surface does not show satisfactory smoothness.

Namely, in the case where the rolled material is manufactured into the disk by means of stamping, and the pretreatment including cutting, grinding, polishing and treatment with zincate or the like is given to the disk, intermetallic compound particles contained in the alloy are left as protrusions on the disk surface, or fall off the disk surface, and as a result, nodules (i.e., semi-spherical protrusions) or micropits are formed on the disk surface resulting from plating its substrate.

For instance, when the intermetallic compound particles protrude from the pretreated disk surface, the protrudent intermetallic compound portions are plated and left as nodules. When the intermetallic compound particles fall off the disk surface at the stage of the pretreatment described above, zincate preferentially grows up in a convex shape in the depressions left by the intermetallic compound particles, in the treatment with zincate. Thus, the convex zincate portions are plated and left as nodules, or the depressions left by the intermetallic compound particles remain as micropits after plating.

If an electroless-plated layer on the disk has a large thickness (i.e., 20 $\mu$m as in the prior art), the nodules or micropits as described above frequently disappear during polishing subsequent to electroless plating, and offer no problem. However, since the thickness of a plated layer on the disk has recently been reduced (i.e., down to 14 $\mu$m or less), nodules or micropits are left on the disk surface even after polishing, and the surface smoothness of the magnetic disk substrate is degraded.

The nodules left on the surface of the magnetic disk substrate collide against a magnetic head, and cause a head crush. The micropits left on the surface of the magnetic disk substrate cause an electric error.

It is conceivable that the nodules or micropits in the magnetic disk substrate can be reduced if a high-purity aluminum material (i.e., purity of 99.99% by weight) containing less impurity elements such as Si and Fe, for instance, is used as the material of the magnetic disk substrate. However, the problem with the use of an aluminum material having purity of 99.99% by weight, instead of an aluminum material having purity of approximately 99.9% by weight, for instance, is that the former is particularly more expensive than the latter, and is limited in its distribution.

Measures to reduce the number or size of intermetallic compound particles in an aluminum alloy sheet have been devised for the purpose of preventing the nodules or micropits as described above from being formed on the magnetic disk substrate. However, such measures have not always attained satisfactory results.

The present inventors have already proposed an aluminum alloy sheet for a magnetic disk substrate, in which a plated substrate layer (i.e., a layer electroless-plated with Ni—P alloy) having less surface defects is obtained by regulating the kinds and contents of alloy elements (See Japanese Patent Laid-open No. Hei 2-97639, U.S. Pat. No. 5,017,337). Although this aluminum alloy sheet for a magnetic disk substrate has been already put to practical use, and is rated highly, such an aluminum alloy sheet has some problems in that it is not possible to provide a large storage memory capacity magnetic disk, i.e. having as much capacity as the latest 2GB/pc. or more.

One of the problems is that recently magnetic heads have been set to a smaller glide height (reduction of glide height is made from 1.5 to 1.0 micro inches, for instance) in order to attain the increase in storage memory capacity of a magnetic disk, and as a result, even fine nodules easily collide against the magnetic head.

Another problem is that in polishing a disk, i.e. in the so-called light polishing, a reduced polishing load has been employed to prevent shear drop from occurring at the end of the disk and to carry out economical polishing, and as a result, more nodules or micropits have been easily left on the disk surface.

A further problem is that the magnetic area per one bit has been made smaller by the need for increasing the storage memory capacity of a magnetic disk, and as a result, even fine micropits on the outermost surface layer of the magnetic disk resulting from plating its substrate easily cause electric errors.

Further, for the purpose of enhancing the strength of a magnetic disk substrate, a magnetic disk substrate has been proposed in which a core material consisting of Al—Mg—Zn alloy (JIS 7000 alloy), one of age hardening aluminum alloys, for instance, is clad with Al—Mg alloy (JIS 5000 alloy) having sufficient plating properties, as a surface material (See Japanese Patent Laid-open Nos. Hei 5-9633 and 5-43970, for instance).

However, since the core material of the clad sheet described above consists of JIS 7000 alloy containing Zn in large quantity (normally 4% by weight or more), there is a great potential difference between the core material and the surface material. Thus, the core material preferentially melts in the etching process prior to the treatment with zincate, resulting in a difference in level (bump) between the core material and the surface material in some cases. When the difference in level between the core material and the surface material is large, a portion corresponding to the difference in level of the magnetic disk is caught by a shaft in mounting, and the surface material is easily exfoliated. Further, unless components of the core material and the surface material are properly combined together, the bonding strength resulting from clad rolling is not sufficient in some cases.

Namely, the conventional clad sheet described above raises problems in its clad rolling properties and in that the potential difference between the core material and the surface material causes the preferential melting of the core material in the etching process prior to the treatment with zincate.

SUMMARY OF THE INVENTION

An object of the present invention is to provide an aluminum alloy sheet for a magnetic disk substrate, in which a matrix differs little in spontaneous potential from an intermetallic compound (in particular, Al—Fe and $Mg_2Si$ intermetallic compounds), in which the size of the above intermetallic compound is small, and in which formation of nodules or micropits is extremely reduced so that plating the substrate provides a further increase in storage memory capacity.

Another object of the present invention is to provide a manufacturing method which enables the manufacture of an aluminum alloy sheet for a magnetic disk substrate smoothly with accuracy so as to attain the above object.

A further object of the present invention is to provide an aluminum alloy clad sheet for a magnetic disk substrate which attains the above object and is manufactured at low cost.

A still further object of the present invention is to provide a manufacturing method which enables the manufacture of an aluminum alloy clad sheet for a magnetic disk substrate smoothly with accuracy so as to attain the above object.

In order to attain the above objects, the present inventors have studied the mechanisms of the formation of micropits and nodules in an aluminum alloy for a magnetic disk substrate, and as a result, they could confirm that the formation of micropits and nodules is closely related to the melting reaction of a matrix and intermetallic compounds (i.e., Al—Fe, $Mg_2Si$, Al—Cu, Al—Mg—Zn, and $Mg_2Al_3$) precipitated in the aluminum alloy.

Namely, the mechanisms of the formation of micropits are as follows.

The melting reaction described above is related to the spontaneous potential difference between the matrix and the intermetallic compound. When the intermetallic compound is more noble than the matrix (i.e., in case of Al—Mg—Zn and $Mg_2Al_3$), the matrix around the intermetallic compound melts in the etching or treatment with zincate, resulting in the formation of depressions. On the other hand, when the intermetallic compound is less noble than the matrix (i.e., in case of Al—Fe and Al—Cu), the intermetallic compound itself melts, resulting in the formation of depressions. In case of the $Mg_2Si$ intermetallic compound, since not only a matrix around this intermetallic compound but also Mg melts, depressions are formed with extremely inert Si left inside. Sometimes, the Si results in the formation of depressions. Then, a plated substrate layer develops so as to be patterned after the shape of the depressions formed as described above, and as a result, micropits are formed.

On the other hand, the mechanisms of the formation of nodules are as follows.

Relatively small or sharp holes are formed in the board surface in pretreatment and zincate preferentially grows in the center of the holes in treatment with zincate and forms nodules. In the other mechanism, an intermetallic compound is left in the depressions, protrudes from the surface and forms nodules. The intermetallic compound in the former case includes Al—Mg—Zn and $Mg_2Al_3$ intermetallic compounds, while that in the latter case includes Al—Fe and Al—Cu intermetallic compounds.

Among the intermetallic compounds described above, $Mg_2Si$ and Al—Fe intermetallic compounds are larger in size than the others. Thus, it is possible to remarkably reduce the micropits or nodules by reducing the number or size of particles of these large-sized intermetallic compounds.

Further, since the $Mg_2Si$ intermetallic compound described above is higher (more noble) in spontaneous potential than the matrix, it is possible to reduce the number of micropits or nodules by making the spontaneous potential of the matrix higher (more noble) so as to reduce the spontaneous potential difference between this intermetallic compound and the matrix.

A first embodiment of the present invention relates to an aluminum alloy sheet for a magnetic disk substrate, which comprises:

a composition consisting of, by percent by weight, 2.0 to 6.0% of Mg, 0.05 to 0.15% of Cu, 0.10 to 0.30% of Zn, and 0.05 to 0.12% of Zr, wherein the contents of Cu, Zn and Zr satisfy the expression: $0.15\% \leq 2Cu+6Zr-3Zn \leq 0.32\%$ (provided that Cu, Zr and Zn in the above expression respectively represent their contents in terms of percent by weight); and the above composition further consists of one or both of 0.01 or more to less than 0.05% of Cr and 0.01 or more to less than 0.05% of Mn, impurities consisting of Si, Fe and Ti which are respectively regulated to be 0.05% or less, 0.05% or less and 0.02% or less, and other inevitable impurity elements respectively regulated to be 0.02% or less, with the remainder being Al.

A second embodiment of the present invention relates to an aluminum alloy sheet for a magnetic disk substrate, in which twenty or less Mg$_2$Si intermetallic compound particles having a major axis of more than 5 µm are existent per unit area (1 mm$^2$) in the neighborhood of a surface layer of the aluminum alloy sheet according to the first embodiment, or ten or less Al—Fe intermetallic compound particles having a major axis of more than 5 µm are existent per unit area (1 mm$^2$) in the neighborhood of the surface layer of the aluminum alloy sheet.

A third embodiment of the present invention relates to a method of manufacturing an aluminum alloy sheet for a magnetic disk substrate, which comprises:

a step of manufacturing a slab by melting and casting an aluminum alloy having the composition as described above;

a step of hot-rolling the slab into an aluminum alloy sheet;

a step of cold-rolling the hot-rolled aluminum alloy sheet; and a step of finally annealing the cold-rolled aluminum alloy sheet;

wherein cooling after the hot rolling, cooling after intermediate annealing carried out in the course of the cold rolling and cooling after the final annealing are respectively carried out at a temperature in the range of 240 to 150° and at a rate in the range of 30 to 600° C./hr; and the cold rolling is carried out three or more times at a rolling reduction of 20% or more on condition that the total rolling reduction is 60% or more.

A fourth embodiment of the present invention relates to an aluminum alloy clad sheet for a magnetic disk substrate, in which one or both surfaces of a core material consisting of at least less than 3.0% by weight of Zn with the remainder being Al and inevitable impurity elements are clad with a surface material consisting of the aluminum alloy sheet for a magnetic disk substrate described above.

A fifth embodiment of the present invention relates to an aluminum alloy clad sheet for a magnetic disk substrate, in which in the clad sheet according to the fourth embodiment, the ratio (Fb/Fs) of F value (Fb) of the core material to F value (Fs) of the surface material is 0.6 or more when F is given by the following expression (1):

$$F=Si+Fe+2Cu+2Mn+3Mg+0.5Zn \tag{1}$$

(provided that Si, Fe, Cu, Mn, Mg and Zn in the above expression (I) respectively represent their contents in terms of percent by weight).

A sixth embodiment of the present invention relates to an aluminum alloy clad sheet for a magnetic disk substrate, in which, in the clad sheet according to the fourth embodiment, twenty or less Mg$_2$Si intermetallic compound particles having a major axis of more than 5 µm are existent per unit area (1 mm$^2$) in the neighborhood of a surface layer on the surface material side of the aluminum alloy clad sheet, or ten or less Al—Fe intermetallic compound particles having a major axis of more than 5 µm are existent per unit area (1 mm$^2$) in the neighborhood of the surface layer on the surface material side of the aluminum alloy clad sheet.

A seventh embodiment of the present invention relates to an aluminum alloy clad sheet for a magnetic disk substrate, in which in the clad sheet according to the fifth embodiment, twenty or less Mg$_2$Si intermetallic compound particles having a major axis of more than 5 µm are existent per unit area (1 mm$^2$) in the neighborhood of a surface layer on the surface material side of the aluminum alloy clad sheet, or ten or less Al—Fe intermetallic compound particles having a major axis of more than 5 µm are existent per unit area (1 mm$^2$) in the neighborhood of the surface layer on the surface material side of the aluminum alloy clad sheet.

An eighth embodiment of the present invention relates to a method of manufacturing an aluminum alloy clad sheet for a magnetic disk substrate, which comprises the steps of:

hot-rolling, cold-rolling and finally annealing a composite material a or b as described below, wherein cooling after the hot rolling, cooling after intermediate annealing carried out in the course of the cold rolling and cooling after the final annealing are respectively carried out at a temperature in the range of 240 to 150° C. and at a rate in the range of 30 to 600° C./hr; and the cold rolling is carried out three or more times at a rolling reduction of 20% or more on condition that the total rolling reduction is 60% or more.

a: a composite material, in which one or both surfaces of a core material consisting of less than 3.0% by weight of Zn with the remainder being Al and inevitable impurity elements are clad with a surface material consisting of the aluminum alloy for a magnetic disk substrate according to the first embodiment b: a composite material, in which one or both surfaces of a core material consisting of less than 3.0% by weight of Zn with the remainder being Al and inevitable impurity elements are clad with a surface material consisting of the aluminum alloy for a magnetic disk substrate according to the first embodiment, and the ratio (Fb/Fs) of F value (Fb) of the core material to F value (Fs) of the surface material is 0.6 or more when F is given by the following expression: F=Si+Fe+2Cu+ 2Mn+3Mg+0.5Zn (provided that Si, Fe, Cu, Mn, Mg and Zn in the above expression respectively represent their contents in terms of percent by weight).

Mg is mainly effective in improving cutting and grinding properties to enhance the surface quality. Mg content less than 2.0% by weight does not show its effects satisfactorily. On the other hand, Mg content more than 6.0% by weight produces an Al—Mg intermetallic compound in the alloy, and also produces non-metallic inclusions such as MgO in large quantity due to high-temperature oxidation at the time of melting and casting. Accordingly, Mg content is limited to 2.0 to 6.0% by weight from the viewpoint of equilibrium of cutting and grinding properties with ease of manufacturing.

Cu is effective in restraining the formation of micropits or nodules by making the spontaneous potential of a matrix noble. A Cu content less than 0.05% by weight does not show its effects satisfactorily. On the other hand, a Cu content more than 0.15% by weight produces a coarse Al—Cu intermetallic compound, resulting in an increase of nodules. Further, non-uniform plating (an aggregate of nodules) occurs, and the surface is formed unevenly. Accordingly, Cu content is limited to 0.05 to 0.15% by weight.

Zn is effective in making the surface, which is treated with zincate, smooth, while reducing non-uniform plating or the like. A Zn content less than 0.10% by weight does not show its effects satisfactorily. On the other hand, a Zn content more than 0.30% by weight makes the spontaneous potential of a matrix less noble, resulting in an increase of micropits or nodules. Accordingly, Zn content is limited to 0.10 to 0.30% by weight.

Zr is effective in restraining the formation of micropits or nodules by making the spontaneous potential of a matrix noble, while improving cutting properties by producing an Al—Zr intermetallic compound. A Zr content less than 0.05% by weight does not satisfactorily show its effects. On the other hand, a Zr content more than 0.12% by weight produces a coarse Al—Zr intermetallic compound, and easily forms micropits or nodules. Accordingly, Zr content is limited to 0.05 to 0.12% by weight.

In addition to the above, the contents of Cu, Zn, Zr need to satisfy the following expression: 0.15% by weight≦2Cu+6Zr−3Zn≦0.32% by weight (provided that Cu, Zr, and Zn in the above expression respectively represent their contents in terms of percent by weight). When the contents of Cu, Zn and Zr do not satisfy the above expression, their effects of controlling the potential of a matrix are not satisfactorily attained, and besides, a large number of micropits or nodules are formed in some cases, even when Al—Fe and $Mg_2Si$ intermetallic compounds are respectively within the scope of the fourth embodiment of the present invention.

Although Cr or Mn produces a fine intermetallic compound in casting, part of the Cr or Mn is dissolved in the matrix as a solid solution and enhances the strength, resulting in improvement in cutting and grinding properties of an aluminum alloy sheet. Further, Cr or Mn also enhances the adhesion of a plated substrate (electroless-plated) layer by making the recrystallized structure finer.

Cr or Mn content less than 0.01% by weight does not show its effects satisfactorily. On the other hand, Cr or Mn content not less than 0.05% by weight results in an excess which crystallizes out of solution in casting, and produces a coarse intermetallic compound. Thus, in this case, the intermetallic compound particles are removed not only in etching and treatment with zincate, but also in cutting or grinding, resulting in the formation of micropits. Accordingly, Cr or Mn content is limited to 0.01 or more to less than 0.05% by weight.

Incidentally, Cr or Mn shows its effects even when added singly. However, coexistence of Cr and Mn further increases their effects.

Mn produces an Al—Fe—Mn compound in combination with an Al—Fe compound, and causes surface defects in some cases. In particular, Mn content is preferably limited to 0.03% by weight. More preferably, Cr content is limited to 0.04% by weight.

Si and Fe as impurities are contained as intermetallic compounds almost without dissolving as a solid solution in aluminum. However, Si and Fe contents respectively more than 0.05% by weight produce a large number of coarse intermetallic compounds such as Al—Fe and $Mg_2Si$ intermetallic compounds, resulting in the formation of micropits or nodules. Accordingly, the contents of these impurities should be regulated to be 0.05% by weight or less, respectively.

Further, the contents of Ti or other inevitable impurity elements (i.e., Ni and B or the like) respectively not more-than 0.02% by weight do not degrade the characteristics of the aluminum alloy sheet according to the present invention.

In the clad sheet according to the fourth embodiment, Zn contained in the core material is effective in making the potential of the core material less noble. Excessive Zn content causes the preferential melting of the core material in the etching process prior to electroless plating. Thus, a difference in level between the core material and the surface material results. In an extreme case, the surface material is exfoliated. Accordingly, Zn content should be limited to less than 3.0% by weight.

In the aluminum alloy sheet according to the second embodiment and the aluminum alloy clad sheet according to the fourth embodiment, twenty or less $Mg_2Si$ intermetallic compound particles having a major axis of more than 5 μm are existent per unit area (1 mm$^2$) in the neighborhood of a surface layer, or ten or less Al—Fe intermetallic compound particles having a major axis of more than 5 μm are existent per unit area (1 mm$^2$) in the neighborhood of the surface layer of the surface material. In this case, there is less formation of micropits or nodules, and as a result, it is possible to obtain a large-capacity magnetic disk of higher quality.

The aluminum alloy sheet for the magnetic disk substrate according to the first embodiment is manufactured by the steps of melting and casting an aluminum alloy having the composition described above into a slab, and then hot-rolling, cold-rolling and finally annealing the slab.

The cooling after the hot rolling, the cooling after intermediate annealing carried out in the course of the cold rolling, and the cooling after the final annealing are carried out at a temperature in the range of 240 to 150° and at a rate in the range of 30 to 600° C./hr. Thus, the number concentration of $Mg_2Si$ intermetallic compound particles having a major axis of more than 5 μm is limited to 20 pcs/mm$^2$ or less in the neighborhood of the surface layer of the alloy sheet. Thus, it is possible to remarkably reduce the number of nodules or micropits in the plated substrate.

Further, the cold rolling is carried out three or more times at a rolling reduction of 20% or more on condition that the total rolling reduction is 60% or more. Thus, the number of Al—Fe intermetallic compound particles having a major axis of more than 5 μm is limited to 10 pcs/mm$^2$ or less in the neighborhood of the surface layer of the aluminum alloy sheet. Thus, it is possible to remarkably reduce the number of nodules or micropits in the plated substrate.

In the present invention, the core material is clad with the surface-material according to various well-known methods. For instance, according to a clad rolling method normally applied to manufacture of a brazing sheet or the like, a core material and a surface material are put together, hot-rolled, cold-rolled and finally annealed to clad the core material with the surface material.

In this clad rolling method, both the core material and the surface material are satisfactorily bonded together by means of clad rolling pressure, in the case where the ratio (Fb/Fs) of F value (Fb) of the core material to F value (Fs) of the surface material is 0.6 or more when F is given by the following expression:

$$F=Si+Fe+2Cu+2Mn+3Mg+0.5Zn$$

(provided that Si, Fe, Cu, Mn, Mg and Zn in the above expression respectively represent their contents in terms of percent by weight). When the above ratio (Fb/Fs) is less than 0.6, the core material is preferentially rolled, while the surface material is not satisfactorily rolled in hot rolling, and as a result, it is imperfectly rolled and its bonding strength is reduced. On the other hand, even if the above ratio (Fb/Fs) is 0.6 or more, lamination sometimes occurs, although not much. Accordingly, the above ratio is preferably 1.0 or more.

The aluminum alloy clad sheet according to the fourth to seventh embodiments is formed by cladding the core material with the surface material. When making an attempt to reduce the defects such as micropits or nodules by increasing the purity of the material, it is sufficient to use a high-purity material for only the surface material in which In this defects are a problem. In this case, a cheap low-purity material may be used for the core material if it has the above composition. Accordingly, it is possible to reduce the manufacturing cost of the magnetic disk substrate as a whole.

In case of cladding the core material with the surface material according to the clad rolling method as described above, when the clad amount {[thickness of surface material/(thickness of core material+thickness of surface material)]×100%} per one surface of the surface material exceeds 30%, shearing force generated at the interface between the core material and the surface material in clad rolling exceeds the bonding strength. Accordingly, the clad amount per one surface of the surface material is preferably 30% or less.

In case of manufacturing the aluminum alloy clad sheet, the cooling after the hot rolling, the cooling after intermediate annealing carried out in the course of the cold rolling and the cooling after the final annealing are carried out at a temperature in the range of 240 to 150° C. and at a rate in the range of 30 to 600° C./hr. By so doing, the number of $Mg_2Si$ intermetallic compound particles having a major axis of more than 5 μm is limited to 20 pcs/mm$^2$ or less in the neighborhood of the surface. Accordingly, it is possible to remarkably reduce the number of nodules or micropits in the plated substrate. Neither a temperature more than 240° C. nor a temperature less than 150° C. causes the precipitation of the $Mg_2Si$ intermetallic compound. A cooling rate less than 30° C./hr causes an increase of precipitated $Mg_2Si$ intermetallic compound particles. On the other hand, a cooling rate more than 600° C./hr causes heat strain, and as a result, the flatness of a base sheet is reduced.

Arbitrary cooling methods are applied to the above cooling steps. In particular, methods by forcibly air-cooling, mist quench spraying and passage through a water tank or the like are easy, and are preferably applied.

In the manufacturing of the aluminum alloy clad sheet, a rolling reduction for individual cold rolling is set to be 20% or more, and the cold rolling is carried out three or more times at the above rolling reduction on condition that the total rolling reduction is 60% or more. By so doing, the Al—Fe intermetallic compound is satisfactorily pulverized, and the number of Al—Fe intermetallic compound particles having a major axis of more than 5 μm is limited to 10 pcs/mm$^2$ or less in the neighborhood of the surface layer of the surface material. Accordingly, it is possible to remarkably restrain micropits or nodules from being formed in the plated substrate.

Further, as the result of simultaneously satisfying the cooling conditions and the cold rolling conditions as described above, the number of $Mg_2Si$ and Al—Fe intermetallic compound particles is remarkably reduced.

In the case of manufacturing the aluminum alloy clad sheet according to the clad rolling method, the surface material is formed by the steps of homogenizing a slab manufactured according to a semi-continuous casting method, for instance, and then hot-rolling the slab into a sheet material of a predetermined size. The optimum temperature conditions in homogenization and hot rolling in this case are determined according to the composition of the surface material. When the temperatures in homogenization and hot rolling are too high, crystal grains of the slab are coarsened, for instance, or melted in an extreme case. On the other hand, when the temperatures described above are too low, deformation resistance in hot rolling is increased. When such deformation resistance is increased beyond the capacity of the rolling machine, the rolling cannot be carried out. In consideration of the above matters, a temperature in homogenization or start temperature in hot rolling is preferably set to be in the range of 350 to 550° C.

When the hot-rolled base sheet is washed in a bared state with nitric acid, caustic soda or the like, an oxidized layer produced in hot working is removed, and as a result, the base sheet is satisfactorily bonded to the core material in a later step.

The core material may have a structure made uniform by homogenizing a slab manufactured by a semi-continuous casting method. If an oxidized film is removed by means of facing after homogenization, the core material is satisfactorily bonded to the surface material. The temperature in homogenization in this case is preferably set to be in the range of 350 to 550° C., similar to the case of the surface material.

DESCRIPTION OF PREFERRED EMBODIMENTS

Hereinafter will be described examples of the present invention.

FIRST EXAMPLE

The Al alloy compositions shown in Table 1 were manufactured by the steps of melting a commercially available Al material having purity of 99.9% or more, and then adding various alloy elements to the melted Al material. After degassing, killing and filtering, this Al alloy was cast into a slab having a thickness of 350 mm, a width of 1000 mm and a length of 2000 mm by means of semi-continuous casting.

Both surfaces of this slab were faced off by 10 mm, respectively, and the resultant slab was soaked at a temperature of 520±20° C. for approximately 6 hours. Subsequently, the soaked slab was rolled into a sheet material having a thickness of 0.82 mm according to a normal rolling method including hot rolling (on condition that the rolling temperature is in the range of 520 to 400° C., rolling pass is carried out about twenty times, and final thickness reaches about 5.5 mm) and cold rolling (on condition that intermediate annealing is included, and the rolling pass is carried out four times).

This sheet material was manufactured into a doughnut sheet having a diameter of 96 mm and a bore of 24 mm by means of stamping. This doughnut sheet was annealed at a temperature of 340° C. for 4 hours, and thereafter ground. Subsequently, the resultant doughnut sheet was plated according to the following conditions, and examinations for micropits, nodules and surface roughness were conducted.

Treatment conditions

Degreasing (treatment with 50% diluted solution of "AD68" manufactured by Uemura Kogyo Kabushiki Kaisha for 6 minutes)

Etching (treatment with 10% diluted solution of "AD101" manufactured by Uemura Kogyo Kabushiki Kaisha for 2 minutes)

Desmutting (treatment with $HNO_3$×30% for 1 minute)

First zincate treatment (treatment with 30% diluted solution of "AD301" manufactured by Uemura Kogyo Kabushiki Kaisha for 1 minute)

Nitric-acid desmutting (treatment with $HNO_3$×30% for 1 minute)

Second zincate treatment (treatment with a solution, similar to that used in the first zincate treatment, for 20 seconds)

Ni—P plating (treatment with "HDX" manufactured by Uemura Kogyo Kabushiki Kaisha up to 13 μm in plating thickness)

The evaluation of micropits was performed by observing a visual field of 3 mm² with an optical microscope, and then counting the number of micropits within this visual field. The observations of micropits were graded A, B, C and D. Namely, a case where the number of observed micropits is less than 5 is rated as A-grade, a case where the number of observed micropits is in the range from 5 or more to less than 15 is rated as B-grade, a case where the number of observed micropits is in the range from 15 or more to less than 25 is rated as C-grade, and a case where the number of observed micropits is not less than 25 is rated as D-grade.

The evaluation of nodules was performed in a manner similar to the evaluation of micropits. The observations of nodules of a size more than 10 $\mu$m were graded A, B, C and D. Namely, a case where the number of observed nodules of the above size is less than 5 is rated as A-grade, a case where the number of observed nodules of the above size is in the range from 5 or more to less than 15 is rated as B-grade, a case where the number of observed nodules of the above size is in the range from 15 or more to less than 25 is rated as C-grade, and a case where the number of observed nodules of the above size is not less than 25 is rated as D-grade.

The surface roughness was measured with a universal surface roughness gauge ("Se-3H" manufactured by Kosaka Kenkyusho). In this embodiment, center-line roughness Ra ($\mu$m) defined by JIS B0601 was measured at four points, and its average value was used to evaluate surface roughness.

Table 1 shows the results of the measurements and the evaluations described above.

As shown in Table 1, it is found that the examples of the present invention are excellent in surface roughness and number of observed micropits and nodules. On the other hand, it is found that the comparative examples outside the scope of the composition of the present invention are inferior in either surface roughness and in number of observed micropits and nodules.

SECOND EXAMPLE

An alloy No. 4 as the example of the present invention and an alloy No. 13 as a comparative example were respectively manufactured into aluminum alloy sheets according to the conditions shown in Table 2. The evaluation of micropits and that of nodules were performed in a manner similar to those in the first example, and Table 2 shows the results of evaluation.

Incidentally, "number of $Mg_2Si$" and "number of Al—Fe" shown in Table 2 respectively represent the number of $Mg_2Si$ intermetallic compound particles having a major axis of more than 5 $\mu$m and existent per unit area of 1 mm² in the neighborhood of a surface layer and the number of Al—Fe intermetallic compound particles having a major axis of more than 5 $\mu$m and existent per unit area of 1 mm² in the neighborhood of the surface layer. The same may be said of Tables 3 and 4 in the following.

TABLE 1

| | | Chemical components | | | | | | | | | | 2Cu + 6Zr − 3Zn | Surface roughness | Micropits | Nodules | General evaluation |
|---|---|---|---|---|---|---|---|---|---|---|---|---|---|---|---|---|
| | | Si | Fe | Cu | Mn | Mg | Cr | Zn | Zr | Ti | Other impurities and Al | | | | | |
| Alloy of the present invention | 1 | 0.03 | 0.03 | 0.05 | 0.021 | 4.1 | — | 0.10 | 0.06 | 0.001 | Remainder | 0.16 | 0.014 | B | A | A |
| | 2 | 0.05 | 0.04 | 0.05 | — | 2.6 | 0.038 | 0.15 | 0.09 | 0.011 | Remainder | 0.19 | 0.015 | B | B | B |
| | 3 | 0.04 | 0.05 | 0.07 | 0.013 | 3.7 | 0.040 | 0.15 | 0.09 | 0.003 | Remainder | 0.23 | 0.014 | B | B | B |
| | 4 | 0.02 | 0.02 | 0.09 | — | 3.9 | 0.045 | 0.17 | 0.10 | 0.004 | Remainder | 0.27 | 0.013 | B | A | A |
| | 5 | 0.02 | 0.02 | 0.09 | — | 4.2 | 0.048 | 0.20 | 0.11 | 0.002 | Remainder | 0.24 | 0.012 | B | B | B |
| | 6 | 0.03 | 0.04 | 0.10 | 0.043 | 3.5 | 0.037 | 0.10 | 0.05 | 0.005 | Remainder | 0.20 | 0.014 | B | B | B |
| | 7 | 0.05 | 0.04 | 0.10 | 0.033 | 4.8 | 0.039 | 0.17 | 0.08 | 0.013 | Remainder | 0.17 | 0.015 | B | B | B |
| | 8 | 0.02 | 0.02 | 0.10 | — | 4.1 | 0.041 | 0.15 | 0.09 | 0.003 | Remainder | 0.29 | 0.013 | B | A | A |
| | 9 | 0.04 | 0.05 | 0.10 | 0.046 | 3.9 | — | 0.25 | 0.12 | 0.006 | Remainder | 0.17 | 0.012 | B | B | B |
| | 10 | 0.02 | 0.03 | 0.13 | 0.044 | 2.9 | — | 0.20 | 0.10 | 0.014 | Remainder | 0.26 | 0.014 | B | A | A |
| | 11 | 0.04 | 0.05 | 0.15 | 0.039 | 4.1 | — | 0.20 | 0.10 | 0.005 | Remaindnr | 0.30 | 0.015 | B | B | B |
| | 12 | 0.03 | 0.04 | 0.15 | 0.045 | 3.7 | 0.041 | 0.29 | 0.12 | 0.012 | Remainder | 0.15 | 0.014 | B | B | B |
| Alloy of the comparative example | 13 | 0.04 | 0.03 | 0.03 | — | 3.6 | — | 0.20 | 0.07 | 0.003 | Remainder | −0.12 | 0.022 | D | D | x |
| | 14 | 0.06 | 0.07 | 0.17 | — | 4.1 | — | 0.17 | 0.09 | 0.025 | Remainder | 0.37 | 0.028 | D | D | x |
| | 15 | 0.03 | 0.04 | 0.10 | 0.031 | 4.0 | 0.042 | 0.20 | — | 0.010 | Remainder | −0.40 | 0.015 | D | D | x |
| | 16 | 0.13 | 0.08 | 0.09 | 0.070 | 3.8 | 0.009 | 0.30 | 0.03 | 0.004 | Remainder | −0.54 | 0.027 | D | D | x |
| | 17 | 0.03 | 0.03 | 0.09 | 0.008 | 4.4 | 0.007 | 0.15 | 0.15 | 0.002 | Remainder | 0.63 | 0.025 | D | D | x |
| | 18 | 0.12 | 0.13 | 0.10 | — | 3.9 | 0.046 | 0.05 | 0.08 | 0.001 | Remainder | 0.53 | 0.024 | D | D | x |
| | 19 | 0.09 | 0.12 | 0.08 | 0.048 | 4.2 | — | 0.35 | 0.10 | 0.030 | Remainder | −0.29 | 0.026 | D | D | x |
| | 20 | 0.04 | 0.04 | 0.13 | 0.025 | 4.3 | 0.033 | 0.30 | 0.09 | 0.006 | Remainder | −0.10 | 0.014 | D | D | x |
| | 21 | 0.03 | 0.04 | 0.08 | 0.036 | 3.5 | 0.020 | 0.10 | 0.10 | 0.008 | Remainder | 0.46 | 0.015 | D | D | x |
| | 22 | 0.05 | 0.08 | 0.15 | — | 3.9 | 0.039 | 0.20 | 0.07 | 0.006 | Remainder | 0.12 | 0.013 | D | D | x |
| | 23 | 0.02 | 0.02 | 0.09 | 0.043 | 4.5 | — | 0.30 | 0.15 | 0.015 | Remainder | 0.18 | 0.015 | D | D | x |
| | 24 | 0.07 | 0.08 | 0.20 | 0.044 | 3.9 | 0.041 | 0.17 | 0.06 | 0.011 | Remainder | 0.25 | 0.023 | D | D | x |
| | 25 | 0.03 | 0.02 | 0.06 | 0.030 | 4.1 | 0.042 | 0.05 | 0.05 | 0.004 | Remainder | 0.27 | 0.025 | D | D | x |
| | 26 | 0.05 | 0.06 | 0.20 | — | 1.8 | 0.033 | 0.30 | 0.08 | 0.002 | Remainder | −0.02 | 0.022 | D | D | x |
| | 27 | 0.04 | 0.04 | 0.12 | — | 6.5 | 0.047 | 0.05 | 0.09 | 0.005 | Remainder | 0.63 | 0.028 | D | D | x |
| | 28 | 0.03 | 0.02 | 0.02 | — | 4.1 | 0.040 | 0.40 | — | 0.001 | Remainder | −1.16 | 0.014 | D | D | x |

TABLE 2

| Alloy | Manufacturing Method | Rolling in cold rolling | | | Cooling rate in final annealing (° C.) | Number of Mg2Si more than 5 μm | Number of Al.Fe more than 5 μm | Micropits | Nodules | General evaluation |
| --- | --- | --- | --- | --- | --- | --- | --- | --- | --- | --- |
| | | Cooling rate in hot rolling (° C./h) | Total rolling reduction (%) | Individual rolling reduction (%) | | | | | | |
| Alloy of the present invention | Method of the present invention | 100 | 65 | 25 | 100 | 3 | 4 | A | A | A |
| | | 100 | 65 | 30 | 500 | 5 | 3 | A | A | A |
| | | 150 | 65 | 15 | 200 | 6 | 22 | B | B | B |
| | | 500 | 50 | 30 | 100 | 8 | 23 | B | B | B |
| | | 200 | 45 | 10 | 150 | 7 | 25 | B | B | B |
| | | 100 | 60 | 20 | 20 | 23 | 9 | B | B | B |
| | | 20 | 65 | 25 | 200 | 21 | 6 | B | B | B |
| | | 15 | 70 | 30 | 15 | 24 | 7 | B | B | B |
| | Method of the comparative embodiment | 20 | 50 | 15 | 20 | 27 | 24 | C | C | C |
| | | 150 | 60 | 10 | 15 | 22 | 21 | C | C | C |
| | | 20 | 45 | 25 | 100 | 26 | 24 | C | C | C |
| | | 15 | 60 | 15 | 700 | 21 | 25 | C | C | C |
| | | 700 | 55 | 10 | 50 | 23 | 22 | C | C | C |
| Alloy of the comparative embodiment | Method of the present invention | 100 | 65 | 25 | 100 | 8 | 10 | D | D | x |
| | | 150 | 65 | 15 | 200 | 17 | 26 | D | D | x |
| | | 100 | 60 | 20 | 20 | 25 | 18 | D | D | x |
| | Method of the comparative embodiment | 20 | 50 | 15 | 20 | 42 | 38 | D | D | x |
| | | 150 | 60 | 10 | 15 | 34 | 31 | D | D | x |
| | | 20 | 45 | 25 | 100 | 32 | 30 | D | D | x |
| | | 15 | 60 | 15 | 700 | 37 | 35 | D | D | x |
| | | 700 | 55 | 10 | 50 | 18 | 39 | D | D | x |

As is apparent from Table 2, when the alloy of the present invention is manufactured into the aluminum alloy sheet according to the conditions of the present invention, it is possible to remarkably reduce the number of micropits and nodules. On the other hand, when the above alloy is manufactured into the aluminum alloy sheet according to the conditions different from the above conditions, the micropits and nodules are increased in number. When the alloy of the comparative example is manufactured into the aluminum alloy sheet, the micropits and nodules are further increased in number.

THIRD EXAMPLE

A surface material and a core material respectively having compositions shown in Tables 3-1 to 3-3 were manufactured into a single-side cladding material having a clad amount of 10%. This cladding material was reheated at a temperature of 500° C., then hot-rolled up to a thickness of 1.75 mm, and subsequently cold-rolled up to a thickness of 0.82 mm. Then, the cold-rolled material was cut to a predetermined size and washed in a bared state to manufacture a clad sheet.

The manufacturing method of the surface material and the core material, and hot rolling, cold rolling and washing conditions of the cladding material are shown in the following.

Method of manufacturing surface material

A slab having a thickness of 30 mm was reduced to a thickness of 20 mm by facing off both surfaces thereof by 5 mm respectively. The resultant slab was homogenized (450° C.×2 hr+520° C.×2 hr), and then hot-rolled (with the rolling start temperature, rolling finish temperature and cooling rate respectively set to be 470° C., 230° C., and 20° C./hr) into a sheet material having a thickness of 5 mm. This sheet material was cut to a predetermined size, and then washed in a bared state (washing in hot water → 3% nitric acid desmutting (1 minute) → 5% caustic soda (5 minutes) → 3% nitric-acid desmutting (1 minute) → washing in hot water).

Method of manufacturing core material

A slab having a thickness of 60 mm was homogenized (450° C.×2 hr+520° C.×2 hr), and then reduced to a thickness of 40 mm by facing off both surfaces thereof by 10 mm respectively.

Hot rolling conditions of cladding material

A cladding material was hot-rolled with the rolling start temperature, rolling finish temperature, coil lifting temperature and cooling rate respectively set to be 470° C., 230° C., 260° C. and 20° C./hr.

Cold rolling conditions of cladding material

The cladding material was cold-rolled on condition that the cladding material is reduced to 1.15 mm (rolling reduction: 34%) in the first pass and to 0.82 mm (rolling reduction: 29%) in the second pass, and a total rolling reduction is set to be 53%.

As for washing conditions of cladding material in bared state (not electroless-plated such as Ni—P), the cladding material was washed in a manner similar to that in washing the surface material.

The clad sheet described above was manufactured into a doughnut sheet having an outer diameter of 96 mm and a bore of 24 mm by means of stamping. This doughnut sheet was annealed at a temperature of 340° C. for 4 hours, then cooled at a cooling rate of 20° C./hr, and further ground. Subsequently, the surface treatment and electroless plating were carried out according to the following procedure.

Namely, degreasing with acetone→etching by means of immersion in 5% NaOH aqueous solution (40° C.) for 30 seconds →desmutting with 30% $HNO_3$ aqueous solution (room temperature) for 30 seconds → double zincate treatment with "Arb 302ZN" (trade name) manufactured by Okuno Seiyaku Kogyo Kabushiki Kaisha → electroless plating with Ni—P up to a thickness of 13 μm with "Naiclad 719" (trade name) manufactured by Okuno Seiyaku Kogyo Kabushiki Kaisha.

The quality of the ground doughnut sheet, that of the plated doughnut sheet and that of the etched doughnut sheet were evaluated as follows.

Evaluation of ground doughnut sheet

The number of $Mg_2Si$ intermetallic compound particles within a visual field of 3 $mm^2$ was measured with a scanning electron microscope (SEM). A case where twenty or less particles having a major axis of more than 5 μm are measured per unit area of 1 $mm^2$ is used as a standard.

The number of Al—Fe intermetallic compound particles within a visual field of 3 $mm^2$ was measured with a scanning electron microscope (SEM). A case where ten or less particles having a major axis of more than 5 μm are measured per unit area of 1 mm² is used as a standard.

Evaluation of doughnut sheet after plating substrate

The number of micropits within a visual field of 3 mm² was measured with an optical microscope. A case where the number of observed micropits is less than 5 is rated as A-grade, a case where the number of observed micropits is in the range from 5 or more to less than 15 is rated as B-grade, a case where the number of observed micropits is in the range from 15 or more to less than 25 is rated as C-grade, and a case where the number of observed micropits is not less than 25 is rated as D-grade.

The number of nodules within a visual field of 3 mm² was measured with an optical microscope. A case where the number of observed nodules of a size more than 10 μm is less than 5 is rated as A-grade, a case where the number of observed nodules of the above size is in the range from 5 or more to less than 15 is rated as B-grade, a case where the number of observed nodules of the above size is in the range from 15 or more to less than 25 is rated as C-grade, and a case where the number of observed nodules of the above size is not less than 25 is rated as D-grade.

Evaluation of etched doughnut sheet (final surface properties)

It was checked as to whether or not the final surface showed a difference in level. The doughnut sheet having a sound final surface free from any difference in level is denoted by O, and that having a final surface with a difference in level is denoted by X.

General evaluation

The evaluation of micropits, that of nodules and that of the final surface properties were graded A, B, C and X as a whole. A, B and C represent a standard level, and X represents a failure. A case of improper manufacture is denoted by—. Tables 3-1 to 3-3 respectively show the results of general evaluation.

TABLE 3-1

| Class | Alloy No. | Section | Chemical composition (% by weight) | | | | | | | | | 2Cu + 6 Zr—3Zn | Fb/Fs |
|---|---|---|---|---|---|---|---|---|---|---|---|---|---|
| | | | Si | Fe | Cu | Mn | Mg | Cr | Zn | Zr | Ti | | |
| Example of the present invention | 1 | Surface material | 0.03 | 0.02 | 0.10 | — | 4.2 | 0.04 | 0.14 | 0.09 | — | 0.31 | 1.11 |
| | | Core material | 0.15 | 0.17 | — | 0.22 | 4.5 | — | — | — | 0.010 | — | |
| | 2 | Surface material | 0.02 | 0.03 | 0.09 | — | 4.0 | 0.04 | 0.19 | 0.11 | — | 0.26 | 1.38 |
| | | Core material | 0.14 | 0.17 | 0.24 | — | 5.4 | 0.02 | — | — | 0.012 | — | |
| | 3 | Surface material | 0.01 | 0.01 | 0.11 | — | 4.1 | 0.04 | 0.15 | 0.09 | — | 0.31 | 1.22 |
| | | Core material | 0.26 | 0.35 | — | 0.61 | 4.5 | 0.16 | — | — | 0.050 | — | |
| | 4 | Surface material | 0.01 | 0.01 | 0.10 | — | 3.9 | 0.04 | 0.16 | 0.08 | — | 0.20 | 1.30 |
| | | Core material | 0.25 | 0.30 | — | 0.16 | 4.9 | 0.15 | — | — | 0.030 | — | |
| | 5 | Surface material | 0.02 | 0.03 | 0.06 | 0.02 | 2.3 | 0.02 | 0.13 | 0.07 | 0.008 | 0.15 | 1.13 |
| | | Core material | 0.12 | 0.11 | — | — | 2.6 | 0.17 | — | — | 0.020 | — | |
| | 6 | Surface material | 0.05 | 0.05 | 0.14 | 0.04 | 5.8 | 0.04 | 0.26 | 0.11 | 0.013 | 0.16 | 0.98 |
| | | Core material | 0.15 | 0.20 | — | 0.21 | 5.6 | 0.05 | — | — | 0.010 | — | |
| | 7 | Surface material | 0.04 | 0.04 | 0.06 | — | 4.5 | 0.04 | 0.18 | 0.10 | — | 0.18 | 0.65 |
| | | Core material | 0.20 | 0.35 | — | — | 2.8 | 0.30 | — | — | 0.040 | — | |
| | 8 | Surface material | 0.03 | 0.04 | 0.14 | — | 3.9 | 0.03 | 0.11 | 0.06 | — | 0.31 | 0.85 |
| | | Core material | 0.21 | 0.30 | — | 0.78 | 2.7 | 0.09 | 0.19 | — | 0.100 | — | |
| | 9 | Surface material | 0.04 | 0.05 | 0.09 | — | 2.1 | 0.02 | 0.19 | 0.10 | 0.009 | 0.21 | 1.20 |
| | | Core mraterial | 2.92 | 0.39 | 0.40 | 1.03 | 0.5 | — | 0.95 | — | 0.010 | — | |
| | 10 | Surface material | 0.03 | 0.03 | 0.14 | — | 5.7 | 0.03 | 0.22 | 0.09 | — | 0.16 | 1.03 |
| | | Core material | 0.15 | 0.20 | — | — | 5.9 | 0.05 | — | — | 0.010 | — | |
| | 11 | Surface material | 0.02 | 0.04 | 0.06 | — | 3.9 | 0.04 | 0.14 | 0.10 | — | 0.30 | 1.07 |
| | | Cure material | 0.25 | 0.34 | 0.17 | — | 2.5 | 0.21 | 2.71 | 0.12 | 0.012 | — | |

| Class | Alloy No. | Propriety for cladding | Number of Mg₂Si | Number of Al—Fe | Micropits | Nodules | End surface properties | General evaluation |
|---|---|---|---|---|---|---|---|---|
| Example of the present invention | 1 | O | 12 | 9 | B | B | O | B |
| | 2 | O | 13 | 7 | B | B | O | B |
| | 3 | O | 14 | 4 | B | A | O | A |
| | 4 | O | 12 | 5 | B | B | O | B |
| | 5 | O | 15 | 7 | C | B | O | C |
| | 6 | O | 23 | 8 | C | B | O | C |
| | 7 | O | 21 | 7 | C | B | O | C |
| | 8 | O | 23 | 8 | C | B | O | C |
| | 9 | O | 16 | 8 | C | B | O | C |
| | 10 | O | 17 | 7 | C | B | O | C |
| | 11 | O | 12 | 7 | B | B | O | B |

TABLE 3-2

| Class | Alloy No. | Section | Chemical composition (% by weight) | | | | | | | | | 2Cu + 6 Zr—3Zn | Fb/Fs |
|---|---|---|---|---|---|---|---|---|---|---|---|---|---|
| | | | Si | Fe | Cu | Mn | Mg | Cr | Zn | Zr | Ti | | |
| Example of the | 12 | Surface material | 0.02 | 0.04 | 0.08 | — | 2.5 | 0.04 | 0.13 | 0.09 | — | 0.31 | 2.00 |
| | | Core material | 0.03 | 0.35 | 4.20 | 0.81 | 1.6 | 0.02 | 0.16 | — | 0.010 | — | |

TABLE 3-2-continued

| | | | Si | Fe | Cu | Mn | Mg | Cr | Zn | Zr | Ti | 2Cu+6 Zr−3Zn | Fb/Fs |
|---|---|---|---|---|---|---|---|---|---|---|---|---|---|
| present invention | 13 | Surface material | 0.02 | 0.04 | 0.08 | — | 2.3 | 0.04 | 0.20 | 0.11 | — | 0.22 | 0.68 |
| | | Core material | 0.61 | 0.35 | 0.31 | — | 1.1 | 0.31 | — | — | 0.050 | — | |
| | 14 | Surface material | 0.02 | 0.03 | 0.10 | — | 4.1 | 0.04 | 0.21 | 0.09 | — | 0.11 | 1.13 |
| | | Core material | 0.14 | 0.17 | — | 0.23 | 4.5 | 0.05 | — | — | 0.010 | — | |
| Comparative example | 15 | Surface material | 0.07 | 0.05 | 0.03 | — | 3.6 | 0.03 | 0.20 | 0.07 | — | 0.12 | 1.29 |
| | | Core material | 0.14 | 0.17 | — | 0.23 | 4.5 | 0.05 | — | — | 0.010 | — | |
| | 16 | Surface material | 0.03 | 0.15 | 0.12 | — | 4.1 | 0.03 | 0.17 | 0.09 | — | 0.27 | 1.09 |
| | | Core material | 0.13 | 0.17 | — | 0.22 | 4.4 | — | — | — | 0.010 | — | |
| | 17 | Surface material | 0.02 | 0.03 | 0.03 | 0.01 | 3.8 | 0.04 | 0.12 | 0.08 | 0.003 | 0.18 | 1.23 |
| | | Core material | 0.14 | 0.16 | — | 0.22 | 4.5 | — | — | — | 0.011 | — | |
| | 18 | Surface material | 0.02 | 0.02 | 0.20 | — | 4.4 | 0.03 | 0.26 | 0.10 | 0.008 | 0.22 | 0.99 |
| | | Core material | 0.14 | 0.18 | — | 0.22 | 4.3 | — | — | — | 0.009 | — | |
| | 19 | Surface material | 0.03 | 0.04 | 0.13 | 0.07 | 4.2 | — | 0.17 | 0.09 | — | 0.29 | 1.11 |
| | | Core material | 0.16 | 0.16 | — | 0.25 | 4.6 | — | — | — | 0.008 | — | |
| | 20 | Surface material | 0.04 | 0.04 | 0.09 | — | 4.1 | 0.08 | 0.27 | 0.08 | 0.002 | −0.15 | 1.11 |
| | | Core mraterial | 0.12 | 0.15 | — | 0.29 | 4.4 | — | — | — | 0.010 | — | |
| | 21 | Surface material | 0.02 | 0.02 | 0.07 | — | 4.0 | 0.04 | 0.06 | 0.07 | 0.010 | 0.38 | 1.19 |
| | | Core material | 0.13 | 0.15 | — | 0.24 | 4.6 | — | — | — | 0.009 | — | |
| | 22 | Surface material | 0.03 | 0.02 | 0.11 | — | 3.9 | 0.04 | 0.35 | 0.09 | 0.010 | −0.29 | 1.15 |
| | | Cure material | 0.14 | 0.16 | — | 0.22 | 4.4 | — | — | — | 0.011 | — | |

| Class | Alloy No. | Propriety for cladding | Number of Mg₂Si | Number of Al—Fe | Micropits | Nodules | End surface properties | General evaluation |
|---|---|---|---|---|---|---|---|---|
| Example of the present invention | 12 | ○ | 13 | 7 | B | B | ○ | B |
| | 13 | ○ | 14 | 8 | B | B | ○ | B |
| | 14 | ○ | 24 | 11 | D | D | ○ | x |
| | 15 | ○ | 22 | 13 | D | D | ○ | x |
| | 16 | ○ | 12 | 15 | C | D | ○ | x |
| Comparative example | 17 | ○ | 12 | 12 | C | D | ○ | x |
| | 18 | ○ | 16 | 14 | C | D | ○ | x |
| | 19 | ○ | 21 | 11 | D | D | ○ | x |
| | 20 | ○ | 23 | 16 | D | D | ○ | x |
| | 21 | ○ | 22 | 12 | D | D | ○ | x |
| | 22 | ○ | 24 | 11 | D | D | ○ | x |

TABLE 3-3

| | | | Chemical composition (% by weight) | | | | | | | | | | |
|---|---|---|---|---|---|---|---|---|---|---|---|---|---|
| Class | Alloy No. | Section | Si | Fe | Cu | Mn | Mg | Cr | Zn | Zr | Ti | 2Cu+6 Zr−3Zn | Fb/Fs |
| Comparative example | 23 | Surface material | 0.04 | 0.04 | 0.09 | — | 4.1 | 0.04 | 0.13 | 0.20 | — | 0.99 | 1.08 |
| | | Core material | 0.14 | 0.17 | — | 0.23 | 4.3 | — | — | — | 0.007 | — | |
| | 24 | Surface material | 0.03 | 0.03 | 0.13 | — | 3.9 | 0.04 | 0.21 | — | 0.011 | −0.37 | 1.17 |
| | | Core material | 0.14 | 0.18 | — | 0.21 | 4.5 | — | — | — | 0.010 | — | |
| | 25 | Surface material | 0.04 | 0.10 | 0.43 | — | 4.3 | — | 0.46 | — | — | −0.52 | 0.49 |
| | | Core material | 0.20 | 0.19 | — | 0.39 | 1.2 | — | 4.19 | — | — | — | |
| | 26 | Surface material | 0.05 | 0.08 | 0.55 | 0.33 | 3.5 | — | 0.26 | — | — | 0.32 | 0.73 |
| | | Core material | 0.25 | 0.27 | 0.11 | 0.39 | 1.8 | — | 4.38 | — | 0.10 | — | |
| | 27 | Surface material | 0.04 | 0.05 | 0.31 | — | 3.0 | 0.12 | 0.92 | — | — | −2.14 | 0.93 |
| | | Core material | 0.17 | 0.20 | — | 0.30 | 2.0 | — | 5.02 | — | 0.110 | — | |
| | 28 | Surface material | 0.03 | 0.05 | 0.17 | — | 3.8 | — | 0.05 | 0.08 | — | 0.67 | 0.95 |
| | | Core material | 0.18 | 0.29 | — | 0.41 | 2.4 | — | 5.60 | — | — | — | |
| | 29 | Surface material | 0.03 | 0.05 | 0.21 | — | 4.4 | — | 0.50 | 0.08 | — | −0.60 | 0.55 |
| | | Core material | 0.14 | 0.15 | 0.21 | 0.23 | 1.4 | — | 4.56 | — | 0.110 | — | |
| | 30 | Surface material | 0.03 | 0.04 | 0.10 | — | 6.3 | 0.04 | 0.17 | 0.10 | — | 0.28 | 0.71 |
| | | Core material | 0.15 | 0.18 | — | 0.24 | 4.3 | — | — | — | 0.010 | — | |
| | 31 | Surface material | 0.02 | 0.02 | 0.10 | — | 4.1 | 0.04 | 0.14 | 0.09 | 0.050 | 0.31 | 1.09 |
| | | Core material | 0.18 | 0.20 | — | 0.22 | 4.3 | — | — | — | 0.010 | — | |

| Class | Alloy No. | Propriety for cladding | Number of Mg₂Si | Number of Al—Fe | Micropits | Nodules | End surface properties | General evaluation |
|---|---|---|---|---|---|---|---|---|
| Comparative example | 23 | ○ | 24 | 12 | D | D | ○ | x |
| | 24 | ○ | 25 | 11 | D | D | ○ | x |
| | 25 | x | — | — | — | — | — | — |
| | 26 | ○ | 14 | 17 | C | D | x | x |
| | 27 | ○ | 22 | 12 | D | D | x | x |
| | 28 | ○ | 24 | 16 | D | D | x | x |
| | 29 | x | — | — | — | — | — | — |
| | 30 | ○ | 24 | 8 | D | C | ○ | x |
| | 31 | ○ | 21 | 12 | D | D | ○ | X |

As is apparent from each of Tables 3-1 to 3-3, in each of aluminum alloy clad sheets (alloy Nos. 1 to 13) of the examples of the present invention, the intermetallic compound particles having a major axis of more than 5 μm are small in number in the neighborhood of the surface layer of the surface material, and as a result, there is less formation of micropits and large-sized nodules. Further, the final surface having been subjected to etching shows excellent properties. In the general evaluation, all the above aluminum alloy clad sheets are up to a standard level. Incidentally, it is found that the surface quality is not subject to the influence of the fact that the core materials are lower in purity than the surface materials in terms of Si and Fe.

As the result of measurement of the surface roughness (Ra), the surface roughness of each of the clad materials of the examples of the present invention was found to be within the extremely satisfactory range of 0.012 to 0.018 μm.

On the other hand, in each of the aluminum alloy clad sheets (alloy Nos. 14 to 31) of the comparative examples, since the alloy composition of the surface material does not satisfy the conditions according to the present invention, micropits or nodules are large in number. In particular, since Zn is contained in large amounts in the core materials of the clad materials (alloy Nos. 26 to 28), these core materials preferentially melt in etching, and a difference in level is seen in the final surface. In the clad materials (alloy Nos. 25 and 29), the ratio (Fb/Fs) of F value of the core material to F value of the surface material does not satisfy the conditions of the present invention. In this case the core material was not satisfactorily bonded to the surface material. Thus, all the clad materials of the comparative examples were not up to the standard on the whole.

FOURTH EXAMPLE

A core material and a surface material of an alloy No. 1 as the example of the present invention and those of an alloy No. 14 as the comparative example in Tables 3-1 to 3-3 were manufactured into cladding materials. Each cladding material was reheated at a temperature of 500° C., then hot-rolled at a rolling start temperature of 470° C. to various thicknesses, and cold-rolled up to a thickness of 0.82 mm. Subsequently, the cold-rolled material was cut to a predetermined size, and then washed in a bared state to manufacture a clad sheet.

The coil lifting temperature in hot rolling, cooling rate, thickness, rolling reduction in cold rolling and conditions of intermediate annealing were varied. Incidentally, the cold-rolled material was washed in a bared state according to a method similar to that in the third example. The core material and the surface material were manufactured also according to a method similar to that of the third example.

Subsequently, the above clad sheet was manufactured into a doughnut sheet having an outer diameter of 96 mm and a bore of 24 mm by means of stamping. This doughnut sheet was annealed at a temperature of 340° C. for 4 hours, then cooled at a cooling rate of 20° C./hr and further ground. Subsequently, the doughnut sheet was subjected to surface treatment and electroless plating according to a procedure similar to that of the third example. The resultant doughnut sheet was evaluated according to standards similar to those of the third example.

Table 4 shows the results of evaluation together with the manufacturing conditions.

TABLE 4

| Class | Sample No. | Alloy No. | Scope of manufacturing method of the present invention Within or without | *Cooling rate ° C./hr | | | Cold rolling | | |
|---|---|---|---|---|---|---|---|---|---|
| | | | | After hot rolling | After intermediate annealing | After final annealing | Rolling reduction in each pass | Number of passes | Total rolling reduction |
| Example of the present invention | 32 | 1 | Within | 50 | — | 50 | 35% | 3 | 73% |
| | 33 | 1 | Within | 50 | 50 | 50 | 30 | 3 | 66 |
| | 34 | 1 | Within | 420 | 50 | 50 | 30 | 4 | 76 |
| | 35 | 1 | Within | 50 | 50 | 420 | 28 | 4 | 73 |
| | 36 | 1 | Without | 20 | — | 20 | 32 | 2 | 54 |
| Comparative example | 37 | 14 | Within | 50 | 50 | 50 | 30 | 3 | 66 |
| | 38 | 14 | Within | 420 | 50 | 50 | 30 | 4 | 76 |
| | 39 | 14 | Without | 50 | 50 | 50 | 30 | 2 | 51 |
| | 40 | 14 | Without | 50 | 50 | 20 | 30 | 3 | 66 |

| Class | Sample No. | Number of $Mg_2Si$ | Number of Al—Fe | Micropits | Nodules | surface properties | End General evaluation |
|---|---|---|---|---|---|---|---|
| Example of the present invention | 32 | 7 | 2 | B | A | ○ | A |
| | 33 | 8 | 6 | B | B | ○ | B |
| | 34 | 6 | 2 | B | A | ○ | A |
| | 35 | 3 | 2 | A | A | ○ | A |
| | 36 | 23 | 15 | C | C | ○ | C |
| Comparative example | 37 | 7 | 12 | D | D | ○ | x |
| | 38 | 8 | 7 | D | C | ○ | x |
| | 39 | 14 | 12 | C | D | ○ | x |
| | 40 | 35 | 8 | D | C | ○ | x |

Note) *Cooling rate at temperature in the range of 240 to 150° C.

As is apparent from the results in Table 4, in each of the clad materials (Samples Nos. 32 to 36) of the examples of the present invention, there is less formation of micropits and nodules, and their final surfaces show satisfactory properties. All the above clad materials are up to a standard level on the whole. Incidentally, since Sample No. 36 was cooled at a low rate after hot rolling and final annealing, and a low total rolling reduction was applied to this Sample, more large-sized micropits or nodules were formed than in Samples Nos. 32 to 35.

On the other hand, since the alloy composition of each Sample Nos. 37 to 40 is outside the scope of the present invention, many large-sized micropits or nodules are formed, although in some cases $Mg_2Si$ or Al—Fe intermetallic compound particles having a major axis of more than 5 µm are small in number depending on the manufacturing conditions. As a result, not all of Samples Nos. 37 to 40 are up to the standard on the whole.

Incidentally, it is deemed that the quantities of particulates of Mg-Si and Al—Fe compounds and the number of micropits or nodules in Tables 1 to 4 generally correlate with each other. However, micropits or nodules actually vary in number under the influence of the kind of intermetallic compounds in the aluminum alloy, the plating conditions and the like, in addition to the above factor. Therefore, it is not possible to make a direct comparison between the results (evaluation rating) of the bare materials (single material) and the clad materials different in plating conditions from each other.

As described above, in the aluminum alloy sheet for a magnetic disk substrate and the clad material of the present invention, since the matrix differs little in spontaneous potential from the $Mg_2Si$ intermetallic compound and the like, there is less formation of micropits or nodules in the plated substrate, so that the aluminum alloy sheet and the clad material may be satisfactorily coated with a magnetic substance.

Further, with the aluminum alloy clad sheet for a magnetic disk substrate of the present invention, it is possible to manufacture an aluminum alloy clad sheet of high quality less expensively by using high-purity Al for the core material.

Furthermore, according to the method of manufacturing the aluminum alloy sheet for a magnetic disk substrate and the clad sheet, it is possible to further reduce the number of micropits or nodules by simply regulating the cooling rate after hot rolling or the rolling reduction in cold rolling. Accordingly, it is possible to increase the capacity of a magnetic disk at low cost, and to produce remarkably satisfactory results on an industrial scale.

What is claimed is:

1. An aluminum alloy clad sheet for a magnetic disk substrate, comprising:

a surface material consisting of an aluminum alloy sheet for a magnetic disk substrate said alloy consisting of, by percent by weight, 2.0 to 6.0% of Mg, 0.05 to 0.15% of Cu, 0.10 to 0.30% of Zn, 0.05 to 0.12% of Zr, 0.01 to <0.05% Cr, 0.01 to <0.05% Mn, Si≦0.05%, Fe≦0.05%, Ti≦0.02%, other inevitable impurity elements≦0.02%, and the balance being aluminum;

wherein the contents of Cu, Zn and Zr satisfy the following relational expression:

$$0.15\% \leq 2Cu+6Zr-3Zn \leq 0.32\%$$

provided that Cu, Zr and Zn in said expression respectively represent their contents in terms of percent by weight and a core material consisting of at least 3.0% by weight of Zn, with the remainder being Al and inevitable impurity elements;

wherein one or both surfaces of said core material are clad with said surface material.

2. An aluminum alloy clan sheet for a magnetic disk substrate according to claim 1, wherein the ratio (Fb/Fs) of F value (Fb) of the core material to F value (Fs) of the surface material is 0.6 or more when F is given by the following expression (1).

$$F=Si+Fe+2Cu+2Mn+3Mg+0.5Zn \qquad (1)$$

provided that Si, Fe, Cu, Mn, Mg and Zn in said expression respectively represent their contents in terms of percent by weight.

3. An aluminum alloy clad sheet for a magnetic disk substrate according to claim 1, wherein twenty or less $Mg_2Si$ intermetallic compound particles having a major axis of more than 5 µm are existent per unit area (1 mm²) at the surface of the surface material of said aluminum alloy clad sheet, or ten or less Al—Fe intermetallic compound particles having a major axis of more than 5 µm are existent per unit area (1 mm²) at the surface of the surface material of said aluminum alloy clad sheet.

4. An aluminum alloy clad sheet for a magnetic disk substrate according to claim 2, wherein twenty or less $Mg_2Si$ intermetallic compound particles having a major axis of more than 5 µm are existent per unit area (1 mm²) at the surface of the surface material of said aluminum alloy clad sheet, or ten or less Al—Fe intermetallic compound particles having a major axis of more than 5 µm are existent per unit area (1 mm²) at the surface of the surface material of said aluminum alloy clad sheet.

* * * * *

UNITED STATES PATENT AND TRADEMARK OFFICE
CERTIFICATE OF CORRECTION

PATENT NO. : 5,939,164
DATED : August 17, 1999
INVENTOR(S) : KUBO et al.

It is certified that error appears in the above-indentified patent and that said Letters Patent is hereby corrected as shown below: On the title page: Item [56]

"References Cited" on the face of the patent:
The date of the third cited referene "10/1969" should be
--9/1966--;
Col. 8, line 63 & 64 "In this" should be
--surface--;
Col. 10 between lines 48 & 49, 52 & 53, 53 & 54, 61 & 62 and 64 & 65
" insert a down arrow "↓"
In Table 1 line 18 under Cr "0.046" should be
--0.045--;
In Table 1 line 22 under Ti "0.006" should be
--0.005--;
In Table 1 line 24 under Mg "3.9" should be
--3.8--;
In Table 1 line 28 under Cr "0.040" should be
--0.048--;
In Table 2 the title "Rolling in cold rolling" should read
--Rolling reduction in cold rolling--.
In Table 3-1 for Alloy No. 5, for " Core material " under Fe, "0.11" should be
--0.17--; and
Col. 22 line 20 "clan" should read --clad--.

Signed and Sealed this

Third Day of April, 2001

Attest:

NICHOLAS P. GODICI

*Attesting Officer*  *Acting Director of the United States Patent and Trademark Office*